United States Patent [19]

Gordon

[11] Patent Number: 4,532,721
[45] Date of Patent: Aug. 6, 1985

[54] TEXTILE DRYER HEAT RECOVERY SYSTEM

[75] Inventor: James S. Gordon, Boston, Mass.

[73] Assignee: MKF Energy Conservation Company, Manchester, N.H.

[21] Appl. No.: 577,179

[22] Filed: Feb. 6, 1984

[51] Int. Cl.$^3$ .......................... F26B 3/04; F26B 21/12
[52] U.S. Cl. .......................................... 34/34; 34/35; 34/54; 34/86
[58] Field of Search ...................... 34/35, 86, 155, 54, 34/34; 165/95

[56] References Cited

U.S. PATENT DOCUMENTS 1,189,752  7/1916  Thompson ........................... 165/95
3,216,127  11/1965  Ruff ..................................... 34/86
4,169,321  10/1979  Nichols ................................ 34/86

OTHER PUBLICATIONS

Condensing Heat Exchanger Corp.-Bulletin 480-Latham, NY undated.

Primary Examiner—Larry I. Schwartz
Attorney, Agent, or Firm—Herbert L. Bello

[57] ABSTRACT

A textile dryer heat recovery system includes a textile dryer and a heat exchanger. A duct is provided for directing dryer exhaust gas to the heat exchanger for preheating dryer input air. A cleaning system within the heat exchanger removes dryer exhaust gas contaminants deposited in the heat exchanger.

10 Claims, 3 Drawing Figures

TEXTILE DRYER HEAT RECOVERY SYSTEM

BACKGROUND OF THE INVENTION

1. Field of the Invention

The present invention relates to heat recovery systems and, more particularly, is directed towards textile dryer heat recovery systems.

2. Description of the Prior Art

In the manufacture of textile products, a padder is used for applying a particular finish or finishes to fabrics in the form of coatings or impregnations in order to impart specific characteristics to the fabrics. Then, the treated fabric is fed to a textile dryer which is fired by coal, oil or natural gas. The exhaust gas from combustion of coal, fuel oil and natural gas contains moisture, sulfur compounds and particulates. In one type of heat exchanger, which is used for devices having a corrosive exhaust gas, the internal surfaces through which heat transfer takes place are coated with a tetrafluoroethelyne polymer in order to provide protection from sulfuric acid corrosive attacks within specific temperature limits. In addition to combustion products, the exhaust gas from the textile dryer contains contaminants such as dye residue, wax, oil, condensates and lint. Attempts to use heat exchangers with textile dryers have not been successful because the contaminants in the exhaust gas rapidly coat the heat exchanger surfaces through which heat transfer takes place. This coating of contaminants prevents efficient preheating of the textile dryer input air and renders the heat recovery system relatively useless. A need has arisen for an efficient heat recovery system for textile dryers.

SUMMARY OF THE INVENTION

It is an object of the present invention to provide a textile dryer heat recovery system which does not suffer from the heretofore mentioned disadvantages.

It is a further object of the present invention to provide a textile dryer heat recovery system comprising a textile dryer and heat exchanger. Since the textile material within the dryer rapidly pollutes the hot air within the dryer, fresh air is continuously drawn into the dryer and the hot air is exhausted. According to the invention, fresh air entering the dryer is preheated in the heat exchanger using dryer exhaust gas. The heat exchanger has a plurality of conduits through which the fresh air passes. The hot dryer exhaust gas is directed at the conduits and heat the fresh air flowing therethrough. The surfaces of the heat exchanger which are exposed to the exhaust gas are coated with a release substance to which the contaminants will not readily adhere. A cleaning system within the heat exchanger is provided for removing contaminants which adhere to the surfaces of the heat exchanger through which heat transfer takes place.

Other objects of the present invention will in part be obvious and will in part appear hereinafter.

The invention accordingly comprises the apparatuses, processes and products, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENT

Figure 1:
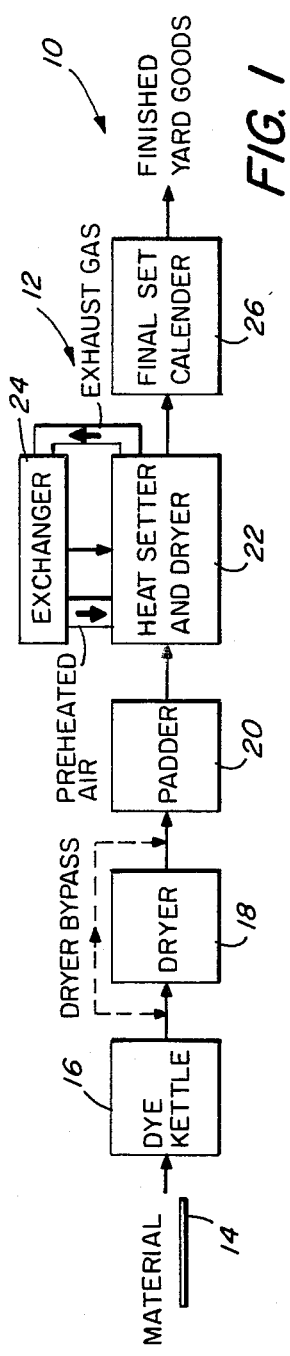
FIG. 1 is a block and schematic diagram of a system for producing finished textile fabrics, the system having a heat recovery system according to the present invention.

Referring now to the drawings, particularly FIG. 1, there is shown a textile processing system 10 with a heat recovery system 12 made according to the teachings of the present invention for producing finished yard goods. In the operation of textile processing system 10, a material 14 is fed to a dye kettle 16. Next, the dyed material is removed from kettle 16 and fed either directly or through a dryer 18 to a padder 20 for application of a finish or a number of finishes. The finishes are applied as coatings or impregnations in order to impart particular properties to the material. The finish treated material is dried in a textile dryer 22 and then sent to a final set calender 26 for sizing and setting to produce the final yard goods. As hereinafter described, exhaust gas from an internal drying chamber 23 of dryer 22 is fed to a heat exchanger 24 for preheating the dryer intake air. The exhaust gas from the dryer 22 contains combustion products, dye residue, lint, wax, oil and condensates, the fresh air being free of exhaust gas.

Figure 2:
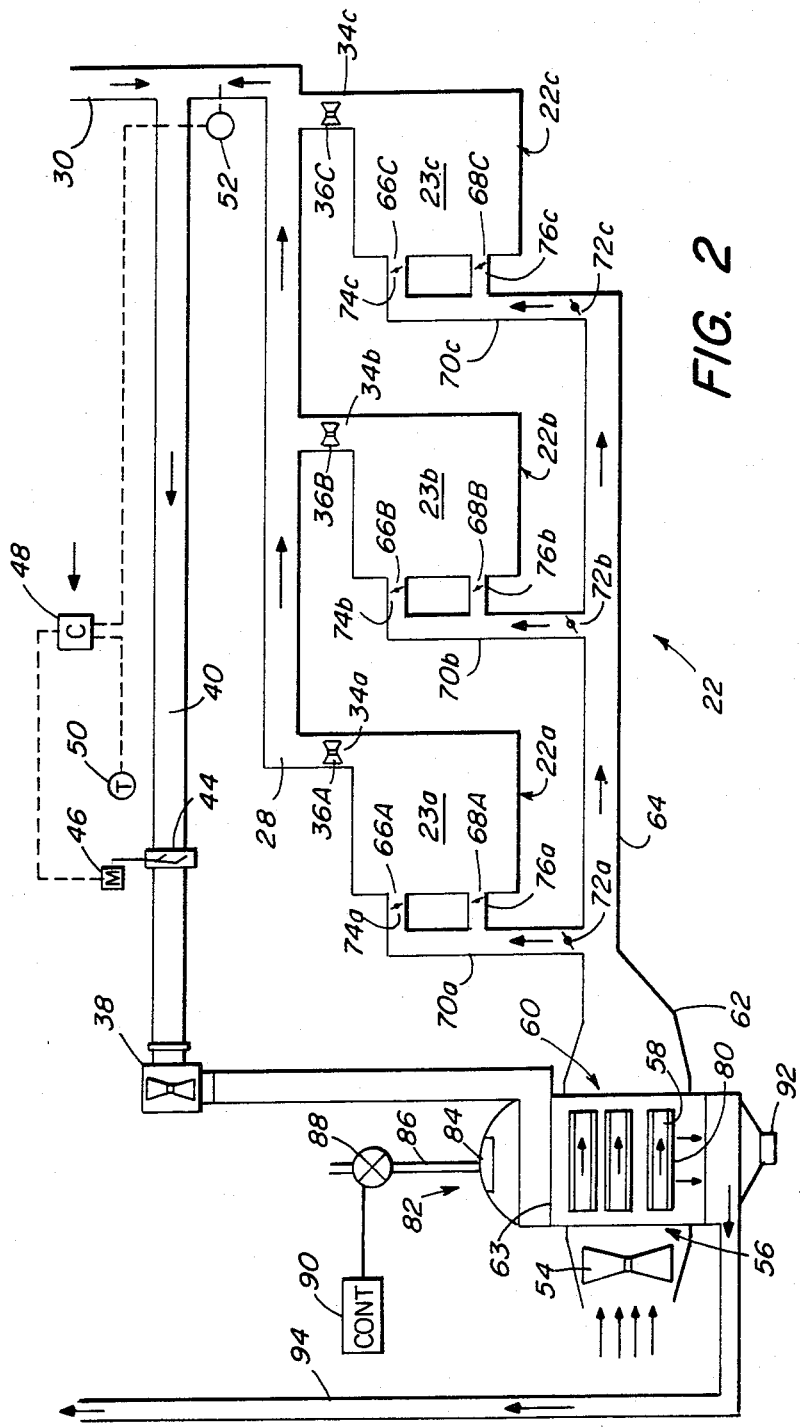
FIG. 2 is a detailed block and schematic diagram of the heat recovery system of FIG. 1.

Referring now to FIG. 2, there is shown the details of heat recovery system 12 which includes textile dryer 22 and heat exchanger 24. In the illustrated embodiment, by way of example, heat exchanger 24 is used in conjunction with three dryers 22a, 22b and 22c. Exhaust gas from each dryer 22a, 22b and 22c flows into a common exhaust duct 28 which is connected to an exhaust flue 30. An exhaust gas outlet port 32a of dryer 22a is connected to exhaust duct 28 by a duct 34a. Ducts 34b and 34c connect exhaust ports 32b and 32c of dryers 22b and 22c to exhaust duct 28. Dampers 36a, 36b and 36c are positioned within ducts 34a, 34b and 34c, respectively, adjacent the outlet ports 32 for regulating the flow of exhaust gas from each dryer. An induction draft fan 38 is positioned in a duct 40 which is connected between exhaust flue 30 and an exhaust gas inlet port 42 of heat exchanger 24. A damper 44, for example an electronically controlled damper, is located between exhaust flue 30 and induction draft fan 38. Damper 44 is controlled by a modulating motor 46 which receives control signals from a controller 48. Temperature signals from temperature sensors 50 and 52 are fed to controller 48. Temperature sensor 50 is positioned in duct 40 between damper 44 and exhaust flue 30. Temperature sensor 52 is positioned in exhaust flue 30 between ducts 28 and 40. When induction draft fan 38 is energized, exhaust gas is pulled into heat exchanger 24. An intake fan 54 pulls fresh ambient air into a fresh air inlet port 56 of heat exchanger 24. The fresh ambient air flows through a series of conduits 58, for example tubular members and a preheated air outlet port 60 to an outlet duct 62. Exhaust gas from dryers 22a, 22b and 22c flow into an internal heating chamber 63 of heat exchanger 24 and about tubular members 58 to preheat the fresh air pulled in by intake fan 54. In one example, the temperature of the fresh air pulled into heat exchanger 24 by intake fan 54 is 90° F. and the temperature of the preheated air at outlet duct 62 is 180° F.

Outlet duct 62 is connected to a common fresh air inlet duct 64 of dryers 22a, 22b and 22c. In the illustrated embodiment, by way of example, each dryer 22 includes upper and lower inlet ports 66 and 68 which are connected to inlet duct 64 by means of transition ducts 70. Dampers 72 in transition ducts 70 controls the flow of preheated air to internal drying chambers 23a, 23b and 23c of dryer 22a, 22b and 22c, respectively. Dampers 74 and 76 in upper inlet port 66 and lower inlet port 68, respectively, selectively control the quantity of preheated air flowing into the dryers 22 through upper and lower inlet ports 66 and 68.

Figure 3:
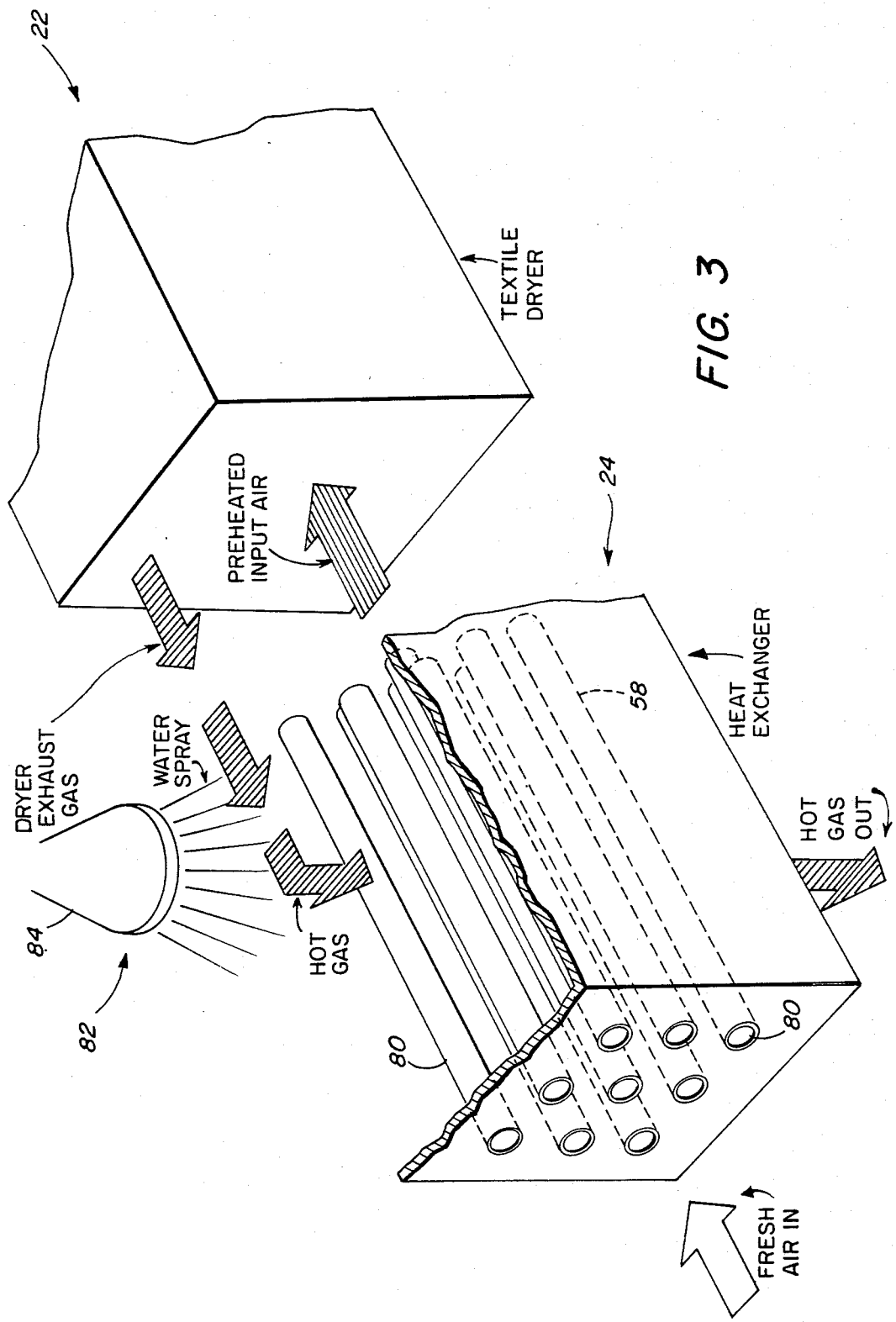
FIG. 3 is a schematic diagram illustrating operation of the heat recovery system of FIG. 2.

As best shown in FIG. 3, each tubular member 58 is provided with a release coating 80 which is composed of a material that will withstand temperatures in excess of 500° F., for example a tetrafluoroethelyne polymer. As previously indicated, the exhaust gas from dryers 22a, 22b and 2c pass over tubular members 58 for preheating of the fresh air entering the dryers. In order to prevent a build up of contaminants on tubular members 58, heat exhanger 24 is provided with a cleaning system 82 which, in one embodiment, includes a water spray nozzle 84. Water is supplied to spray nozzle 84 through a conduit 86 which is provided with a valve 88. A controller 90, which is connected to valve 88, periodically closes the valve and allows water to flow through conduit 86 to spray nozzle 84. Preferably, controller 90 is timed to close valve 88 at regular time intervals. A drain 92 is provided at the bottom of heat exchanger 24 to allow removal of the flushing water from spray nozzle 84. An exhaust flue 94 is connected to heat exchanger 24 for removal of the exhaust gas flowing through the heat exchanger.

In one test of heat recovery system 12 in which the exhaust gas from dryers 22 was pulled into heat exchanger 24 by induction draft fan 38, the temperature of the exhaust gas entering heat exchanger 24 was 260° F. and the temperature of the fresh ambient air entering the heat exchanger 24 was 90° F. The temperature at the preheated air outlet 60 was 180° F. and the temperature of the heat exchanger exhaust gas was 200° F. Accordingly, heat recovery system 12 increased the temperature of the fresh air entering dryer 22 90° F., from the ambient temperature of 90° F. to a preheated temperature of 180° F., by use of the dryer exhaust gas.

Since certain changes may be made in the foregoing description without departing from the scope of the invention herein involved, it is intended that all matter contained in the above description and depicted in the accompanying drawings be construed in an illustrative and not in a limiting sense.

What is claimed is:

1. A method for drying a textile material in a textile heat recovery system, the system including a direct fired textile dryer and a heat exchanger, the textile dryer exhaust gas including dye residue, lint and combustion products, said method comprising the steps of:
   (a) feeding the textile material to be dried into the textile dryer;
   (b) drawing fresh air into the textile dryer;
   (c) heating the fresh air drawn into the textile dryer;
   p1 (d) directing the exhaust gas containing dye residue and lint from the dryer to the heat exchanger;
   (e) drawing fresh air into the heat exchanger;
   (f) heating the fresh air drawn into the heat exchanger with the exhaust gas from the textile dryer, the heated fresh air being free of the exhaust gas; and
   (g) sensing the temperature of the exhaust gas from the textile dryer;
   (h) generating data signals representing the sensed textile dryer exhaust gas;
   (i) controlling the flow of textile dryer exhaust gas directed to the heat exchanger as a function of the data signals; and
   (j) directing the heated fresh air in the heat exchanger to the textile dryer as preheated fresh air.

2. The method as claimed in claim 1 including the step of periodically cleaning the heat transfer surfaces in the heat exchanger.

3. The method as claimed in claim 1 wherein said cleaning step includes spraying water on the heat transfer surfaces in the heat exchanger.

4. A textile dryer heat recovery system comprising:
   (a) a textile dryer with an internal drying chamber, at least one preheated air inlet port and a first exhaust gas outlet port communicating with said drying chamber, preheated air entering said drying chamber through said preheated air inlet port, means within said drying chamber for heating the preheated air entering said heating chamber through said preheated inlet port, exhaust gas exiting said drying chamber through said first exhaust gas outlet port;
   (b) duct means connected to said textile dryer;
   (c) heat exchanger means communicating with said textile dryer through said duct means, said heat exchanger having an internal heating chamber, a fresh air inlet port, an exhaust gas inlet port, a preheated air outlet port and a second exhaust gas outlet port communicating with said heating chamber, fresh air entering said heating chamber through said fresh air inlet port, exhaust gas from said textile dryer entering said exhaust gas inlet port via said duct means, the dryer exhaust gas flowing in said heating chamber from said exhaust gas inlet port to said second exhaust gas outlet port, a plurality of conduits disposed with said heating chamber in the flow path of the dryer exhaust gas in said heating chamber, said conduits connected between said fresh air inlet port and said preheated air outlet port, fresh air flowing through said conduits from said fresh air inlet port to said preheated air outlet port and being heated by the dryer exhaust gas flowing in said heating chamber, said heated air directed to said preheated air inlet of said dryer through said duct means;
   (d) cleaning means mounted within said heating chamber for removing dryer exhaust gas contaminants deposited on said conduits;
   (e) said duct means including a first flue connected to said first exhaust gas outlet port, a second flue connected to said second exhaust gas outlet port, a first duct connected between said first flue and said exhaust gas inlet port and a second duct connected between said preheated air outlet port and said first fresh air inlet port;
   (f) first damper means associated with said second duct for controlling the quantity of preheated fresh air flowing into said preheated air inlet port from said preheated air outlet port;

(g) induction fan means mounted in said first duct for drawing dryer exhaust gas from said first flue and directing it into said exhaust gas inlet port; and (h) second damper means mounted in said first duct for controlling the flow of dryer exhaust gas drawn into said exhaust gas inlet port by said induction fan means; and (i) controller means and temperature sensor means, said controller means operatively connected to said second damper means, said temperature sensor means sensing the temperature of the dryer exhaust gas and generating data signals representing the sensed dryer exhaust gas temperature, said data signals applied to said controller means, said controller means controlling said second damper means as function of the sensed dryer exhaust gas temperature for controlling the flow of dryer exhaust gas drawn into said exhaust gas inlet port.

5. A textile dryer heat recovery system comprising:
(a) a textile dryer with an internal drying chamber, at least one preheated air inlet port and a first exhaust gas outlet port communicating with said drying chamber entering said first inlet port, means within said drying chamber for heating the fresh air entering said heating chamber through said fresh air inlet port, exhaust gas exiting said drying chamber through said first exhaust gas outlet port;
(b) a first exhaust flue connected to said first exhaust gas outlet port;
(c) a heat exchanger with an internal heating chamber, a fresh air inlet port, an exhaust gas inlet port, a preheated air outlet port and a second exhaust gas outlet port communicating with said internal heating chamber, fresh air entering said internal heating chamber through said fresh air inlet port, exhaust gas from said textile dryer entering said exhaust gas inlet port, the dryer exhaust gas flowing in said internal chamber from said exhaust gas inlet port to said exhaust gas outlet port, a plurality of conduits disposed within said heating chamber in the flow path of the dryer exhaust gas in said heating chamber, said conduits connected between said fresh air inlet port and said preheated air outlet port, fresh air flowing through said conduits from said fresh air inlet port to said preheated air outlet port and being heated by the dryer exhaust gas flowing in said heating chamber;
(d) first duct means connected between said first exhaust flue and said exhaust gas inlet port for establishing a flow path for the exhaust gas from said first exhaust flue to said exhaust gas inlet port;
(e) second duct means connected between said preheated air outlet port and said preheated air inlet port;
(f) means for cleaning said conduits;
(g) induction fan means mounted in said first duct means for drawing dryer exhaust gas from said first flue and directing it into said exhaust gas inlet port;
(h) first damper means associated with said second duct means for controlling the quantity of preheated fresh air flowing into said preheated air inlet port from said preheated air outlet port;
(i) second damper means mounted in said first duct means for controlling the flow of dryer exhaust gas drawn into said exhaust gas inlet port by said induction fan means, said second damper means being an electronically controlled damper; and (j) controller means and temperature sensor means, said controller means operatively connected to said second damper means, said temperature sensor means sensing the temperature of the dryer exhaust gas and generating data signals representing the sensed dryer exhaust gas temperature, said data signals applied to said controller means, said controller means controlling said second damper means as a function of the sensed dryer exhaust gas temperature for controlling the flow of dryer exhaust gas drawn into said exhaust gas inlet port.

6. A textile dryer heat recovery system comprising:
(a) a textile dryer with an internal drying chamber, at least one preheated air inlet port and a first exhaust gas outlet port communicating with said drying chamber, preheated air entering said drying chamber through said preheated air inlet port, means within said drying chamber for heating the preheated air entering said heating chamber through said preheated inlet port, exhaust gas exiting said drying chamber through said first exhaust gas outlet port;
(b) duct means connected to said textile dryer;
(c) heat exchanger means communicating with said textile dryer through said duct means, said heat exchanger having an internal heating chamber, a fresh air inlet port, an exhaust gas inlet port, a preheated air outlet port and a second exhaust gas outlet port communicating with said heating chamber, fresh air entering said heating chamber through said fresh air inlet port, exhaust gas from said textile dryer entering said exhaust gas inlet port via said duct means, the dryer exhaust gas flowing in said heating chamber from said exhaust gas inlet port to said second exhaust gas outlet port, a plurality of conduits disposed with said heating chamber in the flow path of the dryer exhaust gas in said heating chamber, said conduits connected between said fresh air inlet port and said preheated air outlet port, fresh air flowing through said conduits from said fresh air inlet port to said preheated air outlet port being heated by the dryer exhaust gas flowing in said heating chamber, said heated air directed to said preheated air inlet of said dryer through said duct means;
(d) cleaning means mounted within said heating chamber for removing dryer exhaust gas contaminants deposited on said conduits;
(e) damper means mounted within said duct means;
(f) temperature sensor means sensing the temperature of said dryer exhaust gas and generating data signals representing the sensed dryer exhaust gas temperature; and
(g) controller means for controlling said damper means, said data signals applied to said controller means, said controller means controlling said damper means as a function of the sensed dryer exhaust gas drawn into said exhaust gas inlet port.

7. The textile dryer heat recovery system as claimed in claim 1 wherein said duct means includes a first flue connected to said first exhaust gas outlet port, a second flue connected to said second exhaust gas outlet port, a first duct connected between said first flue and said exhaust gas inlet port and a second duct connected between said preheated air outlet port and said first fresh air inlet port.

8. The textile dryer heat recovery system as claimed in claim 7 wherein said damper means includes first damper means associated with said second duct for controlling the quantity of preheated fresh air flowing into said preheated air inlet port from said preheated air outlet port.

9. The textile dryer recovery system as claimed in claim 8 including induction fan means mounted in said first duct for drawing dryer exhaust gas from said first flue and directing it into said exhaust gas inlet port.

10. The textile dryer heat recovery system as claimed in claim 9 wherein said damper means also includes second damper means mounted in said first duct for controlling the flow of dryer exhaust gas drawn into said exhaust gas inlet port by said induction fan means.

* * * * *